UNITED STATES PATENT OFFICE.

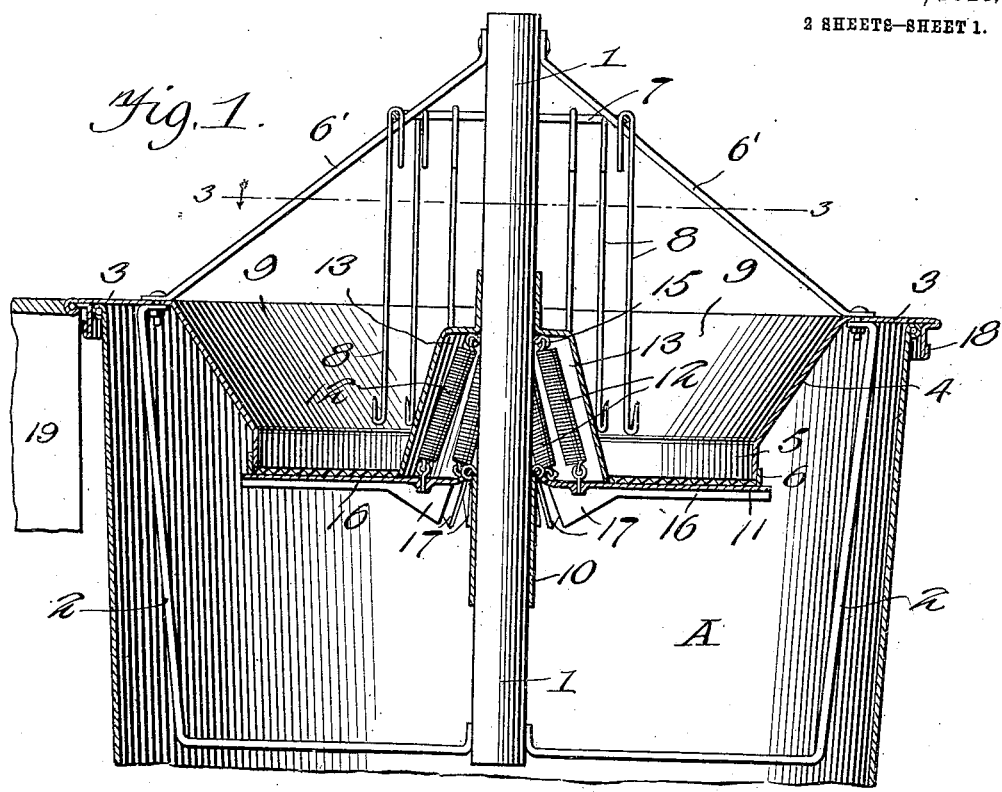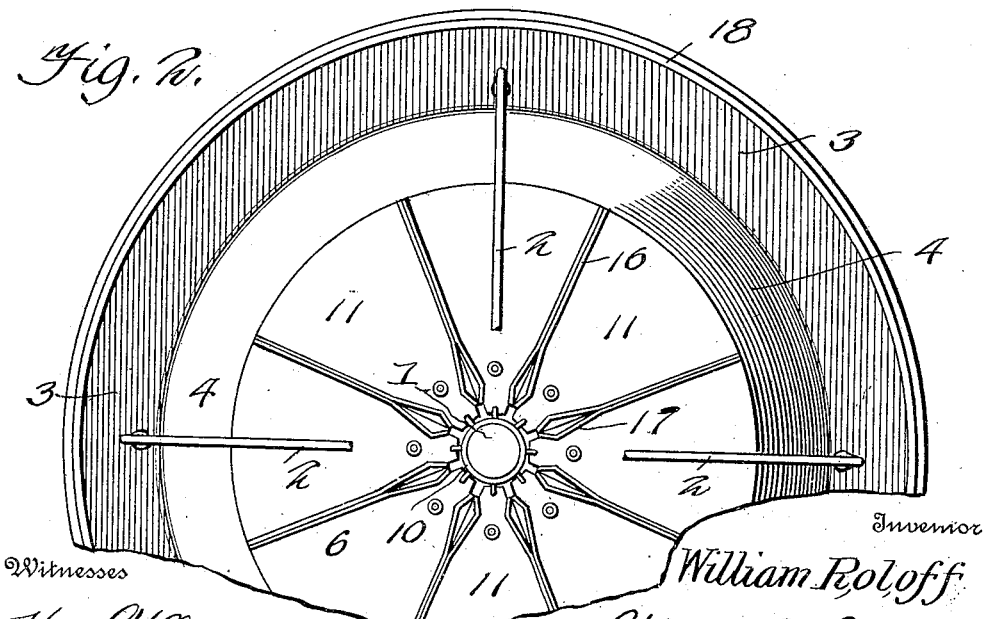

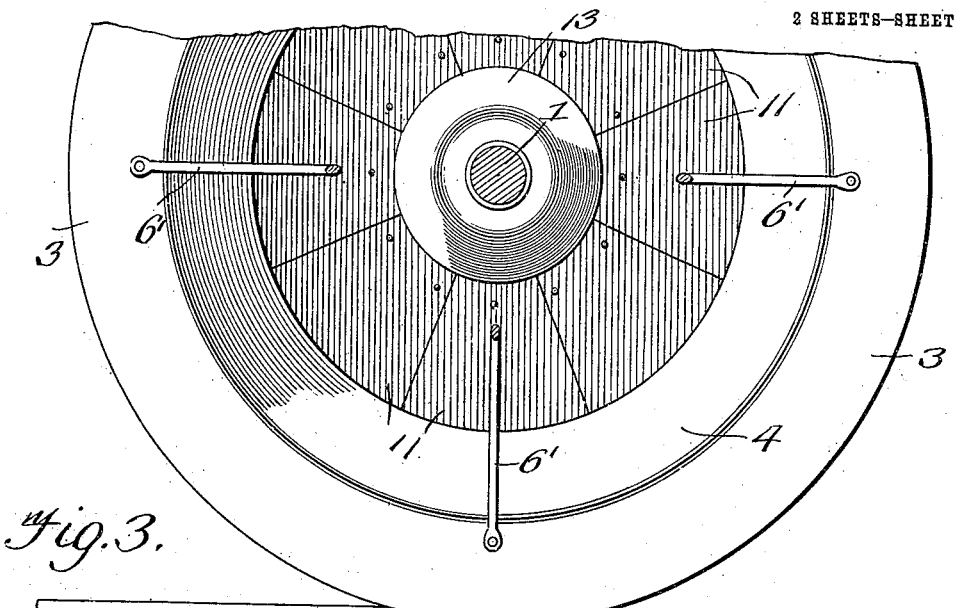
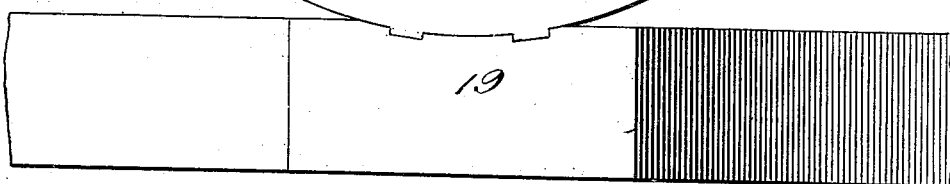
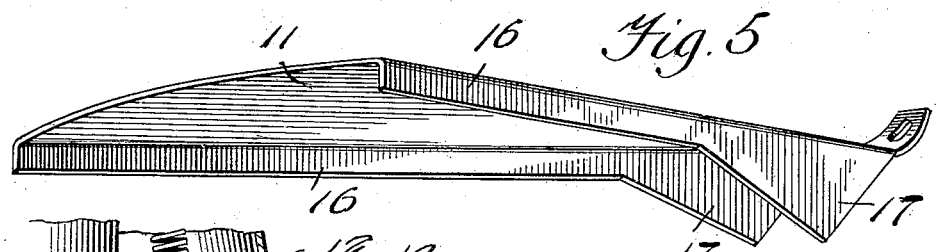
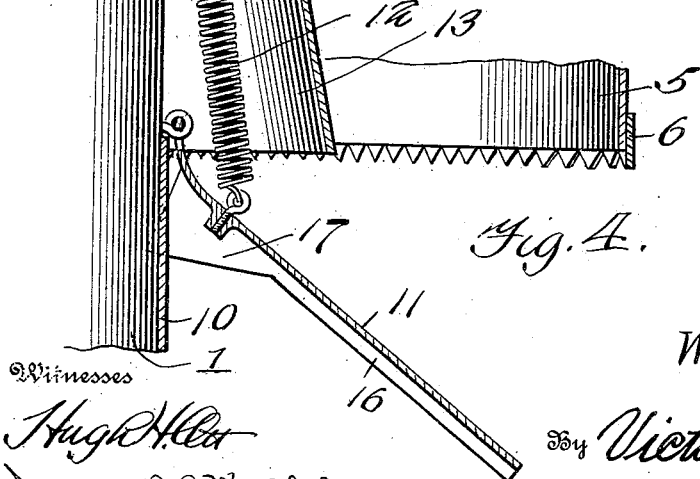

WILLIAM ROLOFF, OF FOND DU LAC, WISCONSIN.

ANIMAL-TRAP.

979,339.  Specification of Letters Patent.  Patented Dec. 20, 1910.

Application filed April 20, 1910. Serial No. 556,478.

*To all whom it may concern:*

Be it known that I, WILLIAM ROLOFF, a citizen of the United States of America, residing at Fond du Lac, in the county of Fond du Lac and State of Wisconsin, have invented new and useful Improvements in Animal-Traps, of which the following is a specification.

This invention relates to animal traps, and has for an object to provide a structure of this character which is designed especially for use in connection with a tub or similar receptacle for water, means being employed so that the animal can be effectively trapped and immediately deposited in the body of water in the receptacle.

In the drawings, forming a portion of this specification and in which like numerals of reference indicate similar parts in the several views:—Figure 1 is a vertical section through my improved trap. Fig. 2 is a bottom plan view thereof. Fig. 3 is a horizontal section taken on the line 3—3 of Fig. 1. Fig. 4 is a detail section taken through a portion of the trap showing one of the platforms in a lowered position. Fig. 5 is a perspective view of one of the platforms.

My improved trap consists of a standard 1 which is provided with radial legs 2 whose extremities are bent upwardly to form supports for a runway 3. This runway is of circular form and it is suitably secured to a downwardly and inwardly flared wall 4. The runway 3 is designed whereby it may be supported upon a receptacle or plug such as the one illustrated at A in Fig. 1 of the drawings. A vertical wall 5 is formed at the lower edge of the wall 3 and to such wall is secured an annular buffer strip 6 of suitable elastic material, the said strip being notched to form substantially V-shaped projections, as illustrated. The standard 1 extends upwardly through the runway 3 and it is connected to the runway by brace members 6'. These brace members support a ring 7 from which is suspended a plurality of bait hooks 8 whose lower extremities extend into the pit or bowl 9 formed by the wall 4.

A sleeve 10 is fitted on the standard 1 and the reduced ends of substantially triangular plates or platforms 11 are hingedly connected thereto. These plates are arranged in a circular series as clearly illustrated, and they are designed to close the lower end of the pit or bowl 9. Helical retractile springs 12 connect the standard 1 with the plates 11 and they yieldingly support the said plates in a horizontal position. The opposite ends of these springs are secured to the stops 15 on the standard 1. The springs are covered by a substantially conical housing 13 which is slidably supported on the standard 1, the said housing being formed to provide an offset portion which is designed to engage the stops 15 so as to limit the downward sliding movement of the housing.

Each platform is formed to provide depending guide flanges 16 and depending stops 17. The stops 17 are constructed so that they will engage the standard to limit the downward swinging movement of the platform. The construction of the device herein described and shown is designed particularly for use in connection with such a water receptacle as that shown in Fig. 1 of the drawings, the object being to direct the animals by suitable bait to the pit or bowl of the structure so as to cause them to step upon the yieldingly supported platform. It will be understood that the springs for supporting the platforms are very weak so that the weight of the animal will be sufficient to lower that particular platform on which he treads, this being sufficient to lower the platform and to cause the animal to be directed into the receptacle A or like water container.

The runway 3 is formed to provide an annular flange 18 which is adapted to fit over the walls of the tub or receptacle A to hold the structure against any accidental displacement. The runway portion 3 has hingedly connected thereto a suitable approach 19 which may be of any form which will readily serve as a lead to the bowl.

I claim:—

1. A trap of the character specified comprising a substantially bowl-like structure having a series of yieldingly supported platforms arranged in a circular series at the bottom of the bowl, a standard supported by the structure, and stops on the platforms adapted to be engaged with the standard to limit the movements of the platforms in one direction.

2. A trap of the character described comprising a bowl-like structure having a series of yieldingly supported platforms arranged in a circular series at the bottom of the structure, a standard supported by the said bowl-like structure, stops on the platforms adapted to be engaged by the standard to limit the movements of the platforms in one direction, a ring suspended above the bowl, and a series of hooks supported by the ring and extending into the bowl and immediately above the said platforms.

3. A trap of the character specified comprising a bowl-like structure provided at its bottom with a pivoted platform, a buffer supported by the said bowl-like structure, a spring for holding the platform yieldingly against the buffer, a standard extending upwardly through the said bowl-like structure, and supporting feet connected with the standard and with the said bowl-like structure.

4. A trap comprising a bowl-like structure having a circular runway, a depending flange extending from the said runway, a plurality of pivoted platforms closing the bottom of the bowl, springs for yieldingly supporting the platforms, a standard extending vertically through the said bowl-like structure, stops formed on the said platforms and adapted to be engaged by the standard so as to limit the movements of the platforms in one direction, and a series of bait supports carried by the standard and extending directly into the bowl-like structure.

In testimony whereof I affix my signature in presence of two witnesses.

WILLIAM ROLOFF.

Witnesses:
 FRANK J. WOLFF,
 ALICE M. VINTON.